United States Patent
Deng

(10) Patent No.: US 11,434,786 B2
(45) Date of Patent: Sep. 6, 2022

(54) COMBINED-CYCLE POWER PLANT WITH THERMAL ENERGY STORAGE

(71) Applicant: Mitsubishi Power Americas, Inc., Lake Mary, FL (US)

(72) Inventor: Benjamin Shimin Deng, Lake Mary, FL (US)

(73) Assignee: Mitsubishi Power Americas, Inc., Lake Mary, FL (US)

( * ) Notice: Subject to any disclaimer, the term of this patent is extended or adjusted under 35 U.S.C. 154(b) by 94 days.

(21) Appl. No.: 16/991,796

(22) Filed: Aug. 12, 2020

(65) Prior Publication Data

US 2022/0049631 A1  Feb. 17, 2022

(51) Int. Cl.
*F01K 23/10* (2006.01)
*F01K 7/16* (2006.01)
(Continued)

(52) U.S. Cl.
CPC ............. *F01K 23/10* (2013.01); *F01K 3/262* (2013.01); *F01K 7/16* (2013.01); *F02C 6/14* (2013.01);
(Continued)

(58) Field of Classification Search
CPC . F01K 23/10; F01K 3/262; F01K 7/16; F02C 6/14; F05D 2220/31; F05D 2220/74;
(Continued)

(56) References Cited

U.S. PATENT DOCUMENTS 4,353,207 A * 10/1982 Lee ................... B01D 53/8631
60/39.182
5,148,668 A   9/1992 Frutschi
(Continued)

FOREIGN PATENT DOCUMENTS

EP         3002423 A1    4/2016
WO   WO-2011077248 A2    6/2011
(Continued)

OTHER PUBLICATIONS

"International Application Serial No. PCT/US2021/045701, International Search Report dated Nov. 25, 2021", 2 pgs.
(Continued)

*Primary Examiner* — Hoang M Nguyen
(74) *Attorney, Agent, or Firm* — Schwegman Lundberg & Woessner, P.A.

(57) ABSTRACT

A power plant can comprise a gas turbine productive of an exhaust gas, a steam turbine, a heat recovery steam generator that extracts heat from gas turbine exhaust gas and supplies fluid to the steam turbine, a thermal storage unit storing a thermal storage working medium that is configured to discharge thermal energy into the fluid supplied from the heat recovery steam generator to supplement power generation by the steam turbine, a first heat exchanger disposed within the heat recovery steam generator to transfer thermal energy from the exhaust gas to the thermal storage working medium, and a second heat exchanger in flow communication with the heat recovery steam generator and the thermal storage unit, the second heat exchanger facilitating a direct heat transfer of thermal energy from the thermal storage working medium in the thermal storage unit to the fluid supplied from the heat recovery steam generator.

20 Claims, 6 Drawing Sheets

(51) Int. Cl.
*F01K 3/26* (2006.01)
*F02C 6/14* (2006.01)

(52) U.S. Cl.
CPC ...... *F05D 2220/31* (2013.01); *F05D 2220/74* (2013.01); *F05D 2220/76* (2013.01); *F05D 2260/213* (2013.01); *F05D 2260/2322* (2013.01); *F05D 2260/42* (2013.01)

(58) Field of Classification Search
CPC ........... F05D 2220/76; F05D 2260/213; F05D 2260/2322; F05D 2260/42
USPC ............................................... 60/39.182, 659
See application file for complete search history.

(56) References Cited

U.S. PATENT DOCUMENTS

| | | | |
|---|---|---|---|
| 7,723,858 | B2 | 5/2010 | Nayef et al. |
| 8,726,663 | B2 | 5/2014 | Schroder et al. |
| 9,322,295 | B2 | 4/2016 | Pang et al. |
| 9,534,508 | B2 | 1/2017 | Brunhuber et al. |
| 10,113,535 | B2 | 10/2018 | Conlon |
| 10,247,044 | B2 | 4/2019 | Barmeier et al. |
| 2008/0127647 | A1 | 6/2008 | Leitner |
| 2011/0277469 | A1 | 11/2011 | Brenmiller et al. |
| 2013/0147197 | A1* | 6/2013 | Goebel ............... F22B 1/006 290/52 |
| 2014/0165572 | A1* | 6/2014 | Pang ................ F02C 7/224 60/736 |
| 2014/0223906 | A1* | 8/2014 | Gee ................ F01K 3/24 60/641.15 |
| 2015/0143811 | A1* | 5/2015 | Pang ................ F01N 3/206 60/772 |
| 2015/0267566 | A1* | 9/2015 | Vamvas ............... F28D 20/026 60/786 |
| 2018/0245485 | A1* | 8/2018 | Conlon ............... F01K 23/10 |

FOREIGN PATENT DOCUMENTS

| | | |
|---|---|---|
| WO | WO-2015146786 A1 | 10/2015 |
| WO | WO-2015149124 A1 | 10/2015 |
| WO | WO-2022036066 A1 | 2/2022 |

OTHER PUBLICATIONS

"International Application Serial No. PCT/US2021/045701, Written Opinion dated Nov. 25, 2021", 4 pgs.

* cited by examiner

COMBINED-CYCLE POWER PLANT WITH THERMAL ENERGY STORAGE

TECHNICAL FIELD

This document pertains generally, but not by way of limitation, to combined-cycle power plants utilizing a gas turbine engine, a heat recovery steam generator, and a steam turbine. More specifically, but not by way of limitation, the present application relates to combined-cycle power plants that operate in conjunction with a thermal energy storage unit.

BACKGROUND

In a gas turbine combined-cycle (GTCC) power plant, a gas turbine engine can be operated to directly generate electricity with a generator using shaft power. Hot exhaust gas of the gas turbine engine can additionally be used to generate steam within a heat recovery steam generator (HRSG) that can be used to rotate a steam turbine shaft to further produce electricity.

As renewable energy gains a greater foothold in energy production, energy storage has become an important part of renewable energy power plants. Thermal energy storage (TES) technologies have been applied to power generation systems in attempts to improve plant operability.

In general there are three kinds of TES systems: (1) sensible heat storage (SHS) that is based on storing thermal energy by heating or cooling a liquid or solid storage medium such as water, molten salt or sand; (2) latent heat storage that uses phase change materials (PCM), e.g. a material that changes from a solid state into a liquid state; and (3) thermo-chemical storage (TCS) that uses a thereto-chemical material that can undergo a chemical reaction to store and release thermal energy. Currently sensible heat storage is relatively inexpensive and much less complicated; PCM and TCS are expensive and, as of yet, largely experimental.

For power generation, a combination of TES with a concentrating solar power (CSP) plant can enable solar heat to be stored for electricity production when sunlight is not available. For example, a molten salt TES system can be used in combination with CPS.

Examples of combined cycle power plants incorporating a thermal energy storage unit are described in U.S. Pat. No. 9,322,295 to Pang et al.; U.S. Pat. No. 10,012,113 to Vamvas; and U.S. Pat. No. 10,113,535 to Conlon.

OVERVIEW

The present inventor has recognized, among other things, that problems to be solved in GTCC power plants can include inefficiencies associated with operation in load-following modes. A load-following power plant is operated in direct response to changing demand for power supply and usually runs during the day and early evening. The power plant either shuts down or greatly curtails output during the night and early morning, when the demand for electricity is the lowest. Turn-down of GTCC power plants at very low loads (~20%) is preferred to shutdown overnight, as it has advantages, such as (1) increasing dispatchability; (2) reduction in operating and maintenance costs; and (3) reduction of emissions by lowering the number of gas turbine (GT) start-ups and shut-downs. However, the selling price of power to the grid during off-peak operation is much lower than at the peak price.

The present subject matter can help provide solutions to this problem and other problems, such as by using a TES system to store heat energy of the bottoming cycle in a GTCC (e.g., from a heat recovery steam generator (HRSG) during off-peak periods and later releasing the heat energy during peak periods to boost power generation. As a result, the energy for generating electricity during periods of lower-price is upgraded to higher value for producing higher-price electricity. As such, GTCC power plants with a TES system can have (1) improved performance, such as by operating at a higher power output and lower heat rate at base load and (2) increased profit, such as by being able to sell more electricity at higher prices.

In an example, a power plant can comprise a gas turbine productive of an exhaust gas, a steam turbine, a heat recovery steam generator that extracts heat from exhaust gas and supplies heated fluid to the steam turbine, a thermal storage unit storing a thermal storage working medium that is configured to discharge thermal energy into the heated fluid supplied from the heat recovery steam generator to supplement power generation by the steam turbine, a first heat exchanger disposed within the heat recovery steam generator to transfer thermal energy from the exhaust gas to the thermal storage working medium, and a second heat exchanger in flow communication with the heat recovery steam generator and the thermal storage unit, the second heat exchanger facilitating a direct heat transfer of thermal energy from the thermal storage working medium in the thermal storage unit to the heated fluid supplied from the heat recovery steam generator.

In another example, a method of operating a power plant can comprise extracting heat from exhaust of a gas turbine to generate a heated fluid, turning a steam turbine with the heated fluid, heating a thermal storage working medium with the exhaust, storing the thermal storage working medium in a thermal storage unit, and transferring heat from the thermal storage working medium to the heated fluid.

In an additional example, a gas turbine power plant can comprise a gas turbine operable to generate exhaust gas, a heat recovery steam generator configured to receive the exhaust gas from the gas turbine to heat a fluid, a steam turbine configured to be driven by the heated fluid produced by the heat recovery steam generator, at least one electric generator configured to be driven by the gas turbine or the steam turbine, a thermal energy storage system for a thermal storage working medium, the thermal energy storage system comprising a first heat exchanger configured to be in communication with the exhaust gas and the thermal storage working medium, and a second heat exchanger configured to be in communication with the heated fluid and the thermal storage working medium, and a controller configured to heat the thermal storage working medium in the first heat exchanger during turn-down operation of the heat recovery steam generator and heat the heated fluid in the second heat exchanger during base operation of the heat recovery steam generator.

This overview is intended to provide an overview of subject matter of the present patent application. It is not intended to provide an exclusive or exhaustive explanation of the invention. The detailed description is included to provide further information about the present patent application.

Figure 1:
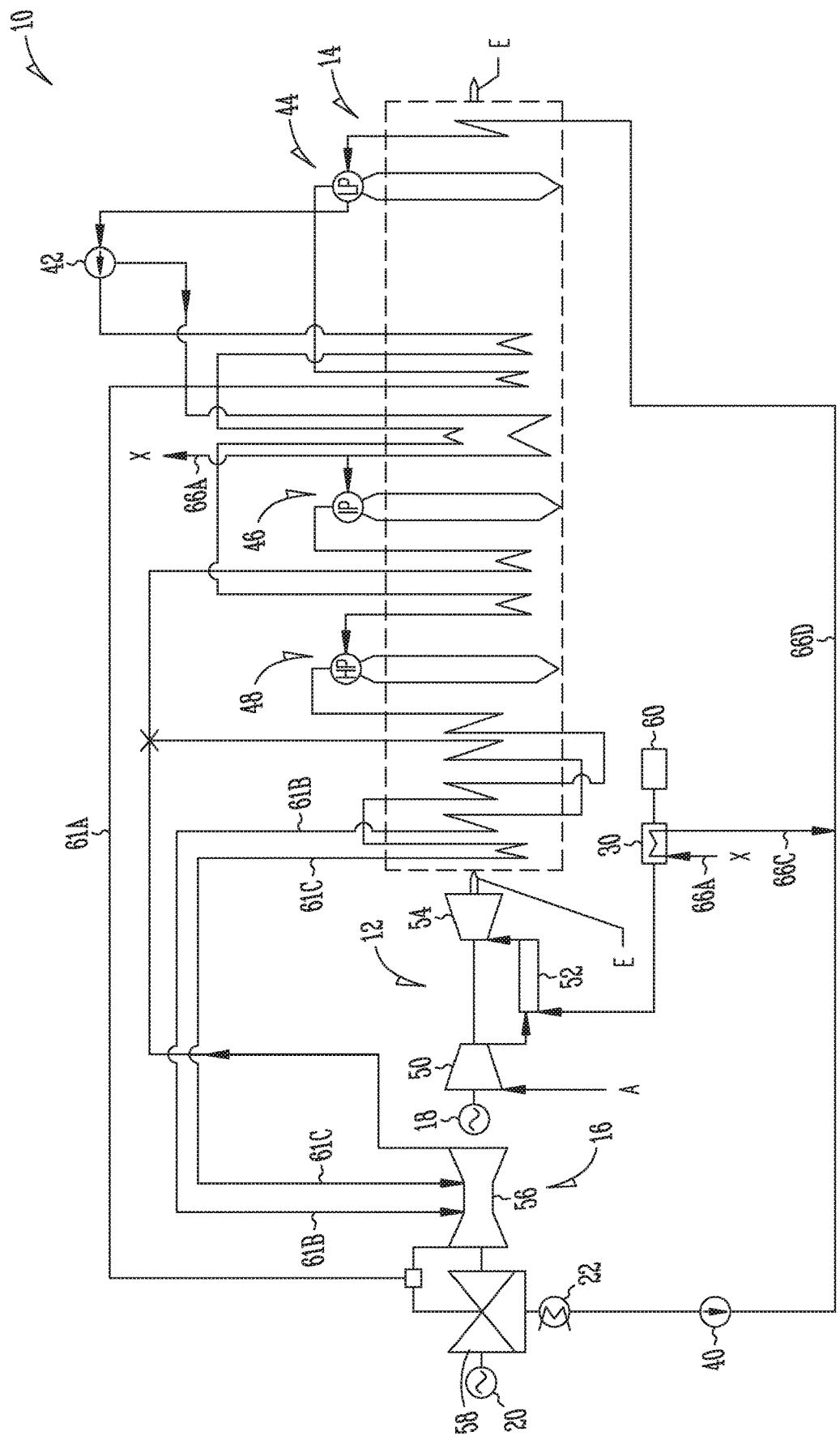
FIG. 1 is a schematic diagram illustrating a typical Gas Turbine Combined Cycle (GTCC) power plant operating a gas turbine in conjunction with a Heat Recovery Steam Generator (HRSG) and steam turbine.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

FIG. 1 is a schematic diagram illustrating Gas Turbine Combined Cycle (GTCC) power plant 10 having gas turbine engine (GTE) 12, Heat Recovery Steam Generator (HRSG) 14 and steam turbine 16. GTE 12 can be used in conjunction with electrical generator 18, and steam turbine 16 can be used in conjunction with electrical generator 20. Power plant 10 can also include condenser 22, fuel gas heater 30, condensate pump 40 and feedwater pump 42. HRSG 14 can include low pressure section 44, intermediate pressure section 46 and high pressure section 48. Condenser 22 can form part of a cooling system and can comprise a surface condenser. GTE 12 can include compressor 50, combustor 52 and turbine 54. Steam turbine 16 can include IP/HP spool 56 and LP spool 58.

Ambient air A can enter compressor 50. The compressed air can be fed to combustor 52 and mixed with fuel from fuel source 60, such as natural gas. The compressed air from compressor 50 can be mixed with the fuel for combustion in combustor 52 to produce high energy gas for turning turbine 54. Rotation of turbine 54 can be used to produce rotational shaft power to drive compressor 50 and electrical generator 18. Exhaust gas E (also referred to herein simply as exhaust) can be directed to HRSG 14, where exhaust gas E interacts with appropriate water/steam tubes in high pressure section 48, intermediate pressure section 46 and low pressure section 44 to produce steam. The steam can be routed to dual spool 56 and single spool 58 of steam turbine 16 via steam lines 61C, 61B and 61A to produce rotational shaft power to operate electrical generator 20. In the exemplary embodiment of FIG. 1, dual spool 56 comprises an IP/HP spool and single spool 58 comprises an LP spool. Exhaust gas E can exit HRSG 14 utilizing any appropriate venting means, such as a stack. HRSG 14 can additionally include appropriate means for conditioning exhaust gas E to remove potentially environmentally hazardous materials. For example, HRSG 14 can include a Selective Catalytic Reduction (SCR) emissions reduction unit. Water from HRSG 14 can also be used to perform fuel heating at fuel gas heater 30 with water line 66A, as is shown by arrows X-X, and water can then be returned to low pressure section 44 via lines 66C and 66D.

During minimum load operation of GTCC power plant 10, such as during turn-down operation during off-peak hours, the efficiency of power plant 10 can be reduced. For example, GTE 12 can continue to operate to avoid complete shut-down and associated lengthy re-start times such that power plant 10 can remain ready to rapidly come on-line in the event of an increase in power demand. Additionally, increased emissions associated with start-up can be avoided. As such, HRSG 14 can remain in an operational state with exhaust gas E continuing to flow therethrough. Since demand for electricity generation during off-peak hours is low, the price commanded for such power is also low. The present inventor has recognized that heat generated by gas turbine 12 during turn-down or off-peak operation can be captured and stored for later use during base or peak operation when the demand and price for power is higher, without significantly impacting the efficiency of power plant 10 during turn-down operation (at least to the extent that overall efficiency of power plant 10 during turn-down and peak times are considered in total). Thus, for example, GTCC power plant 10 can include Thermal Energy Storage (TES) system 80 (FIG. 2) to capture heat from exhaust gas E within HRSG 14, store the heat, and release the heat to HRSG 14. Accordingly, the TES system 80 can time-shift heat input to the HRSG 14, thereby increasing overall economy of power plant 10.

Figure 2:
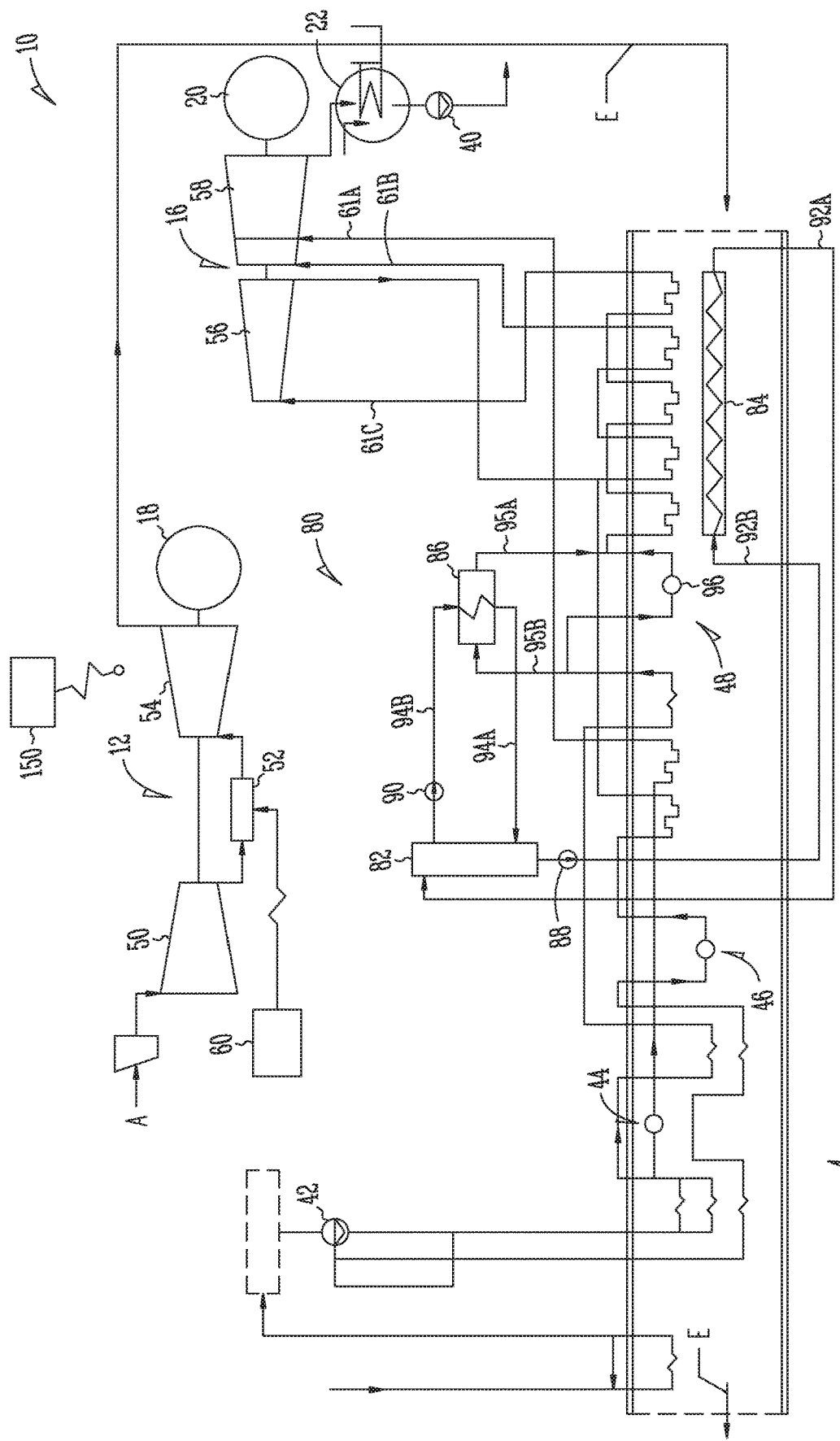
FIG. 2 is a schematic diagram illustrating a Gas Turbine Combined Cycle (GTCC) power plant of the present application having a Thermal Energy Storage (TES) system.

FIG. 2 is a schematic diagram illustrating Gas Turbine Combined Cycle (GTCC) power plant 10 of FIG. 1 modified according to the present disclosure to include Thermal Energy Storage (TES) system 80. FIG. 2 utilizes the same reference numbers where appropriate to indicate the same or functionally equivalent components as FIG. 1, with new reference numbers added to indicate additional components. Note, in FIG. 2, spools 56 and 58 are shown in a different configuration than in FIG. 1, but function equivalently. TES system 80 can comprise thermal energy storage container 82, first heat exchanger 84, second heat exchanger 86, first pump 88 and second pump 90. Storage container 82 can be coupled to first heat exchanger 84 via lines 92A and 92B, and to second heat exchanger 86 via lines 94A and 94B. Lines 92B and 94B can comprise inlet lines and lines 92B 92A and 94A can comprise outlet lines. Second heat exchanger 86 can be connected to high pressure section 48 via lines 95A and 95B. In particular, the second heat exchanger 86 extracts water from high pressure section 48 upstream of drum 96 and provides steam to high pressure section 48 downstream of drum 96 to efficiently add heat to the bottoming cycle. Thus, flow to heat exchanger 86 and drum 96 can be in parallel. Pumps 88 and 90 are shown in lines 92B and 94B, respectively, but can be positioned in any suitable location.

In examples, storage container 82 can comprise any suitable thermal storage energy system that utilizes a thermal storage working medium. In examples, storage container 82 can comprise a sensible heat storage (SHS) unit that operates by storing thermal energy by heating or cooling a liquid or solid thermal storage working medium such as water, molten salt or sand. An example of a solid storage medium using molten salt is described in detail with reference to FIG. 3. additional examples, storage container 82 can comprise a latent heat storage unit that operates using a phase change material (PCM) as the thermal storage working medium, such as a material that changes from a solid state into a liquid state. In additional examples, storage container 82 can comprise a thermo-chemical storage (TCS)

unit that operates using a thermal storage working medium that undergoes a chemical reaction to store and release thermal energy.

In a heating mode of storage system 80 (e.g., where the thermal storage working medium is being heated), cool thermal storage working medium from storage container 82 can flow to first heat exchanger 84 through line 92B, such as under power from pump 88. Within heat exchanger 84, heat from exhaust gas E can be imparted into the thermal storage working medium, thereby also cooling exhaust gas E. In the example shown, exhaust gas E and the thermal storage working medium flow in an opposite-flow relationship, with exhaust gas E flowing toward cooler thermal storage working medium and the thermal storage working medium flowing toward hotter exhaust gas E. However, in other examples, the thermal storage working medium and exhaust gas E can flow in the same direction. After heating within first heat exchanger 84, the thermal storage working medium can flow back into storage container 82 through line 92A. The heating mode can be operated during off-peak power consumption periods for the power plant 10 such that heat generated by gas turbine 12 and transported into HRSG 14 via exhaust gas E can be saved for later use. Thereafter, pump 88 can be powered off or otherwise disengaged and the heated thermal storage working medium can be stored in storage container 82 for subsequent use, e.g., during base or peak load operation.

In a cooling mode of storage system 80 (e.g., where the thermal storage working medium is being cooled), hot thermal storage working medium from storage container 82 can flow to second heat exchanger 86 through line 94B, such as under power from pump 90. Within heat exchanger 86, heat from the thermal storage working medium can be imparted into the working fluid of HRSG 14, e.g., water, to thereby cool the thermal storage working medium. In examples, water in heat exchanger 86 can be evaporated into steam by hot thermal storage working medium. After becoming cooled within second heat exchanger 86, the thermal storage working medium can flow back into storage container 82 through line 94A. The cooling mode can be operated during peak power consumption periods for the power plant 10 such that additional heat from the thermal storage working medium can be used to increase the efficiency of HRSG 14 and total power output of plant 10. Thereafter, pump 90 can be powered off or otherwise disengaged and the cooled thermal storage working medium can be stored in storage container 82 for subsequent use, e.g., during turn-down or off-peak operation.

Figure 3:
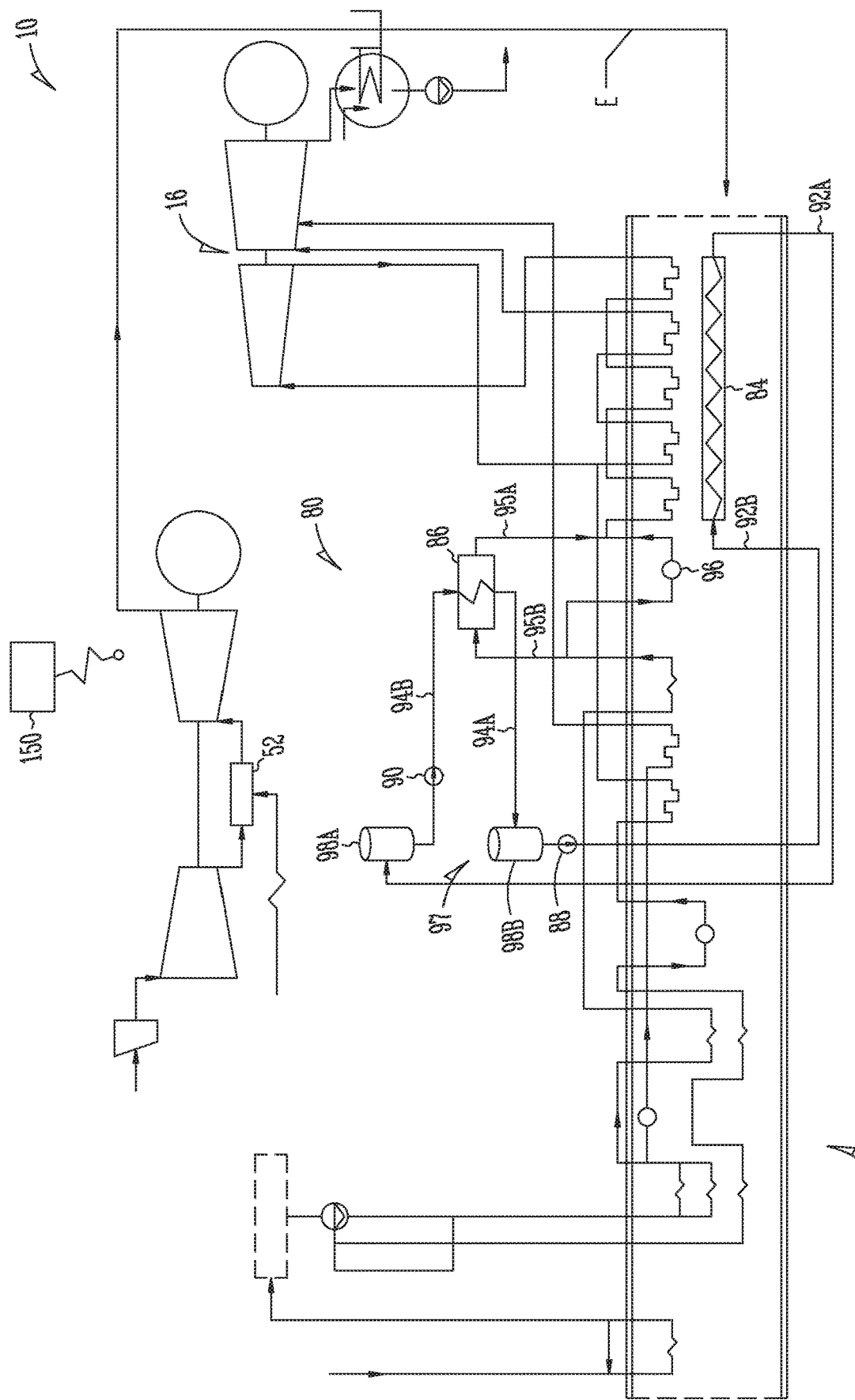
FIG. 3 is a schematic diagram illustrating the GTCC power plant of FIG. 2 with the TES system comprising a dual storage tank system that utilizes a molten salt storage medium.

FIG. 3 is a schematic diagram illustrating GTCC power plant 10 of FIG. 2 with TES system 80 having storage container 82 comprising dual storage tank system 97. Dual storage tank system 97 can comprise hot storage tank 98A and cold storage tank 98B that utilizes a thermal storage working medium. As such, FIG. 3 includes the same elements as FIG. 2 with the exception of storage container 82 replaced by storage tanks 98A and 98B. In the example of FIG. 3, the thermal storage working medium can comprise a liquid storage medium, such as molten salt. Storage tanks 98A and 98B can comprise separate or isolated storage containers that can keep hot or heated thermal storage working medium separate from cold or cooled thermal storage working medium, thereby avoid mixing of thermal storage working medium in different states. As such, each of storage tanks 98A and 98B can be insulated as desired to increase system efficiency. Furthermore, separate storage tanks 98A and 98B can additionally facilitate maintenance of TES system 80 by allowing portions of the system emptied of thermal storage working medium to be worked on.

Figure 4:
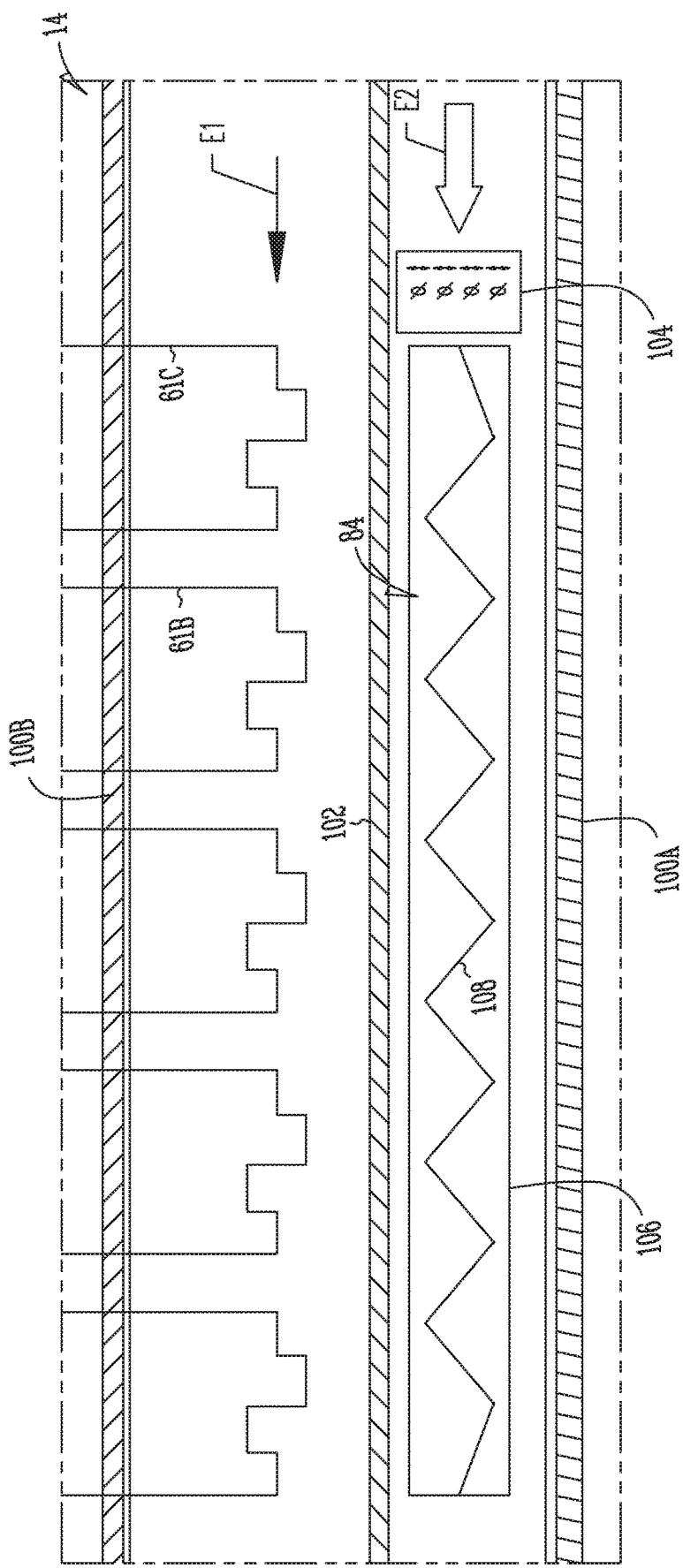
FIG. 4 is a schematic illustration of a heat exchanger within a Heat Recovery Steam Generator (HRSG) configured to exchange heat between a storage medium and a gas turbine working medium.

FIG. 4 is a schematic illustration of first heat exchanger 84 of FIGS. 2 and 3 shown inside HRSG 14. HRSG 14 can comprise one or more panels that form a duct for exhaust gas E to be bounded on all sides. For example, HRSG 14 can comprise lower duct wall 100A and upper duct wall 100B, and walls (not shown) into and out of the depth of the page. Walls 100A and 100B can form a flow path in which heat exchanger 84 can be positioned to interact with exhaust gas E. HRSG 14 can further comprise divider wall 102 that can be positioned between lower duct wall 100A and upper duct wall 100B to sub-divide the flow path into a separate flow path for heat exchanger 84. Flow of exhaust gas E above and below divider wall 102 can be in parallel, e.g., exhaust gas E can simultaneously flow across high pressure piping 61C and intermediate pressure piping 61B of HRSG 14 and heat exchanger 84. Housing 106 of heat exchanger 84 can be positioned between lower duct wall 100A and divider wall 102. Piping 108 for thermal storage working medium, can extend within housing 106 such that exhaust gas E flowing through housing 106 can thermally interact with the thermal storage working medium. In other examples, piping 108 can be directly mounted between divider wall 102 and lower duct wall 100A without housing 106. Heat exchanger 84 can further comprise damper 104 to control flow of exhaust gas E between divider wall 102 and lower duct wall 100A, e.g., across heat exchanger 84. Damper 104 can be operated to intermittently prevent (e.g., completely cut-off) or inhibit (e.g., substantially reduce) flow of exhaust gas E across heat exchanger 84. Specifically, damper 104 can be operated to limit flow of exhaust gas E across heat exchanger 84 during base or peak production to, for example, limit exposure of the components of heat exchanger 84 to exhaust gas E, which can be at higher temperatures during base or peak production relative to turn-down operation.

Figure 5:
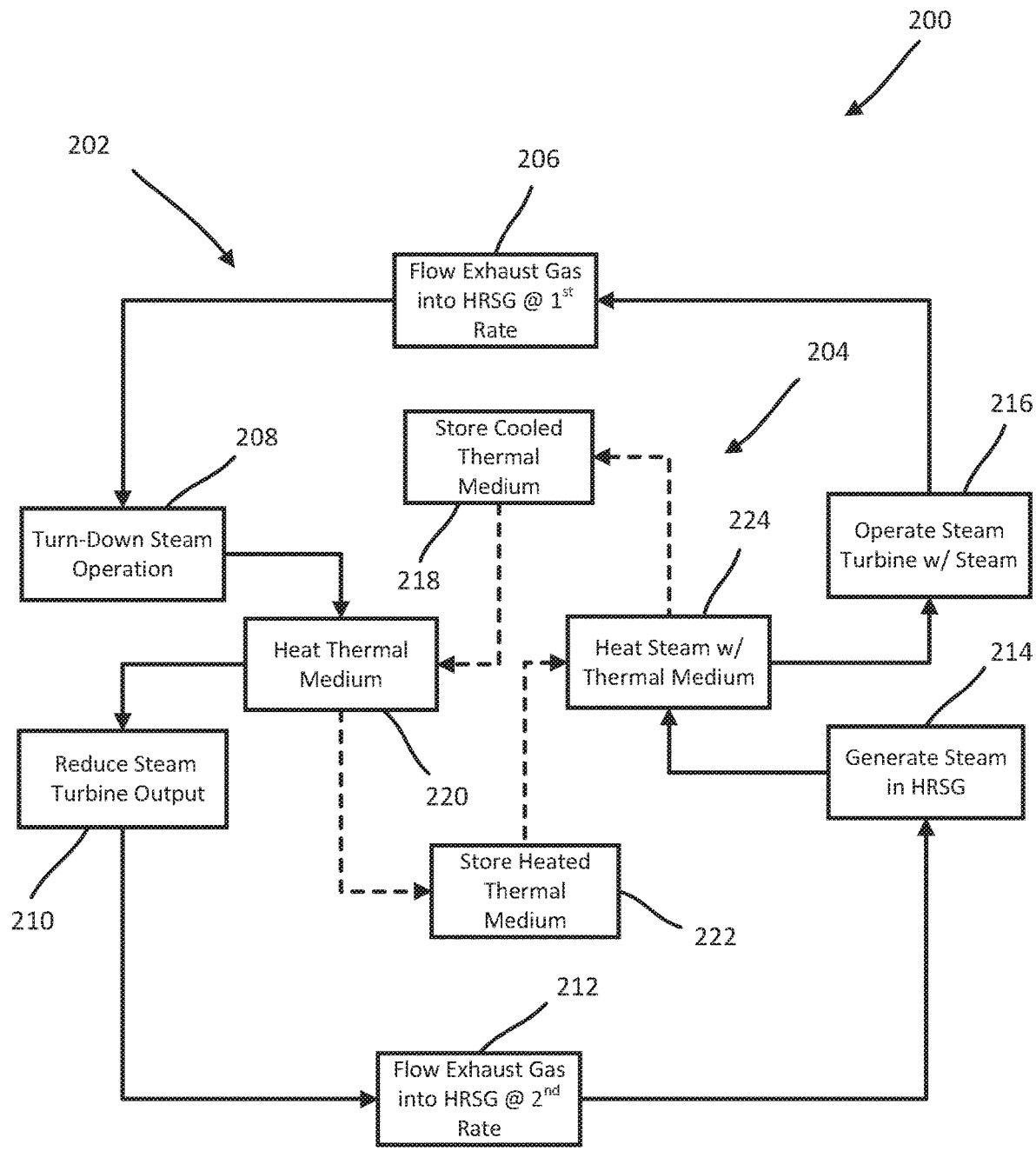
FIG. 5 is a line diagram illustrating steps of methods for operating a GTCC power plant and a Thermal Energy Storage system of the present disclosure.

FIG. 5 is a line diagram illustrating steps of method 200 for operating GTCC power plant 10 using Thermal Energy Storage system 80 of the present disclosure.

In sub-process 202, GTCC power plant 10 including GTE 12, HRSG 14, and steam turbine 16 can be operated such that GTE 12 provides exhaust gas E to HRSG 14, and HRSG 14 provides steam to steam turbine 16, at two or more different rates during base and turn-down operating modes, respectively.

In sub-process 204, TES system 80 can be operated such that thermal storage working medium is circulated between hot storage tank 98A and cold storage tank 98B to withdraw and deposit thermal energy into HRSG 14 as desired.

At step 206, GTE 12 can be operated to provide a first flow of exhaust gas E to HRSG 14 at a first rate. The first rate can be sufficient to generate electricity with generator 18 (FIG. 1) using GTE 12 in turn-down, or below base or peak operation.

At step 208, HRSG 14 can be operated at a turn-down level. The first rate can comprise a turn-down state where exhaust gas E is provided at a volume and/or temperature sufficient to maintain operation of HRSG 14 without shutting-down.

At step 210, the first rate of flow of exhaust gas E can be at a level where HRSG 14 generates sufficient steam to operate steam turbine 16 at a level below base or peak operation.

As such, steps 206-210 can comprise operation of GTCC power plant 10 at non-peak operation, such as at nighttime, where power demand is low. However, rather than shutting-down GTCC power plant 10, which would require long shut-down and re-start times that would not be preferred, GTCC power plant 10 can remains operating at low levels so that re-start times are reduced.

At step 212, GTCC power plant 10 can be operated to provide a second flow of exhaust gas E to HRSG 14 at a second rate. The second rate can be sufficient to generate electricity with generator 18 (FIG. 1) using GTE 12 at base or peak operation.

At step 214, HRSG 14 can be operated at normal operating levels. The second rate can comprise base power operating state where exhaust gas E is provided at a volume and/or temperature sufficient to maintain base output of HRSG 14 and the steam turbine 16 is operated via the exhaust heat E of GT 12.

At step 216, steam turbine 16 can be powered up to the base operating level. Additionally, the second rate of flow of exhaust gas E can be at a level where HRSG 14 generates sufficient steam to operate steam turbine 16 at base operation.

As such, steps 212-216 can comprise operation of GTCC power plant 10 at base operation, such as during daytime, where power demand is high. Thus, GTCC power plant 10 can cycle between base operation and turn-down operation as needed to produce power with steam turbine 16 or be in a stand-by mode so as to be able to come on-line rapidly.

In order to increase to efficiency of GTCC power plant 10, TES system 80 can be simultaneously operated selectively to remove heat from HRSG 14 during low demand or inefficient operating states and to add heat to HRSG 14 during high demand or efficient operating states.

At step 218, thermal storage working medium can be stored in cold storage tank 98B.

At step 220, thermal storage working medium can be transferred to first heat exchanger 84, such as by operation of pump 88. Within heat exchanger 84, heat from exhaust gas E can be transferred to the thermal storage working medium.

At step 222, hot thermal storage working medium can be transferred to hot storage tank 98A, such as by operation of pump 88.

At step 224, hot thermal storage working medium can be transferred to second heat exchanger 86, such as by operation of pump 90. Within heat exchanger 86, heat from thermal storage working medium can be transferred to water/steam within HRSG 14. Peak steam turbine 16 output can thus be greater than base load, and result from the sum of heat provided by GT 12 exhaust and thermal storage working medium.

As such, heat can be extracted from exhaust gas E by the thermal storage working medium and transferred to steam of HRSG 14 by the thermal storage working medium at a later time to selectively add heat and increase output and/or efficiency to the operation of HRSG 14 when desirable by an operator of GTCC power plant 10.

Figure 6:
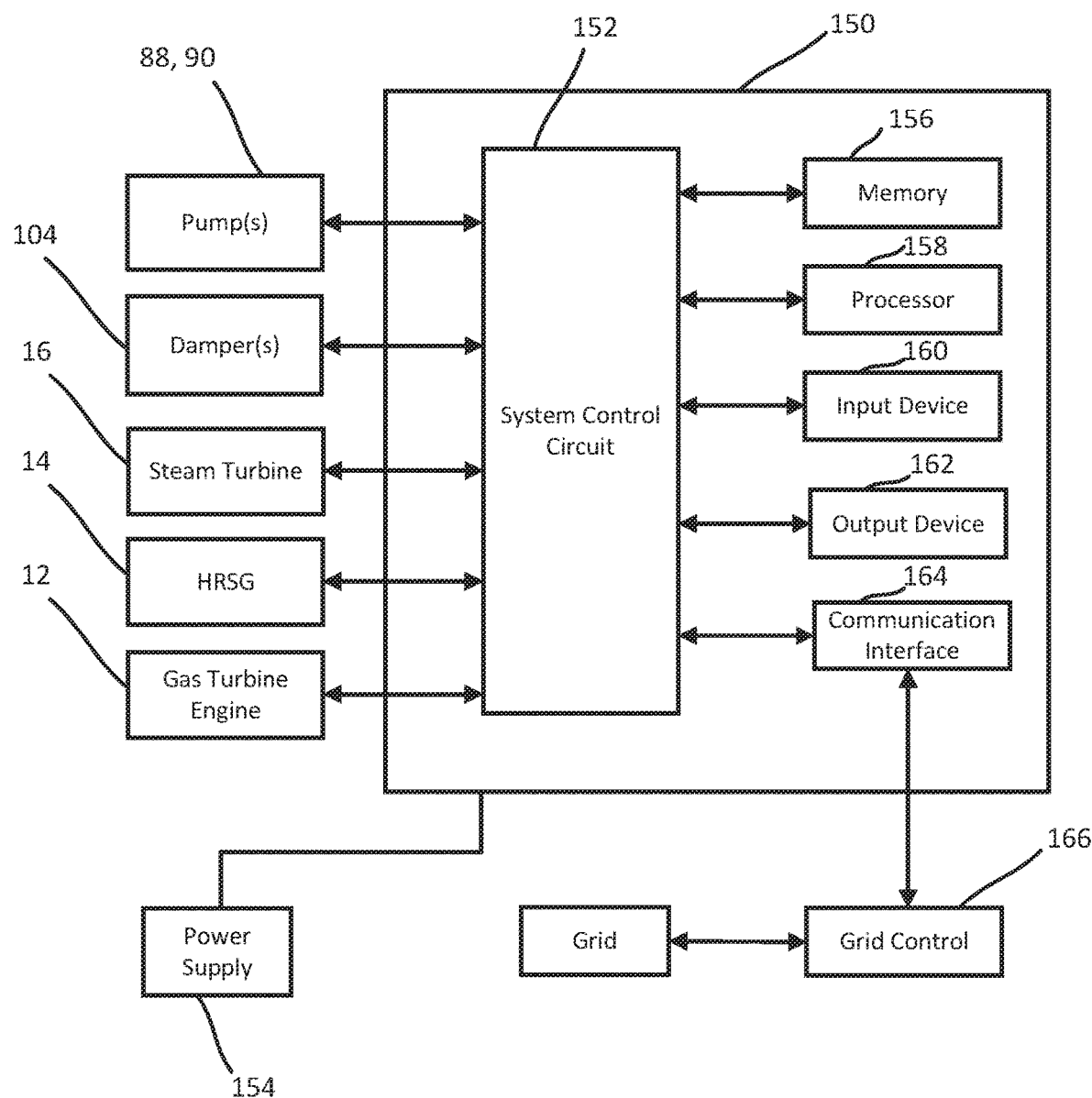
FIG. 6 is a schematic diagram illustrating components of a controller for the GTCC power plant of FIGS. 1-4 and with which the method of FIG. 5 can be executed.

FIG. 6 is a schematic diagram illustrating components of controller 150 for GTCC power plant 10 of FIGS. 1-4 and with which method 200 of FIG. 5 can be executed. Controller 150 can include circuit 152, power supply 154, memory 156, processor 158, input device 160, output device 162 and communication interface 164. Controller 150 can be in communication with grid control 166, which can provide power to end users via the electrical power grid. Controller 150 can also be in communication with gas turbine engine 12 and the various components thereof such as combustor 52, HRSG 14, steam turbine 16, pump 88, pump 90 and damper 104.

Controller 150 can be configured to control the combustion process in combustor 52 of gas turbine engine 12, which can alter the power output of the gas turbine engines to influence the speed of turbine shafts and the flow of exhaust gas E to HRSG 14. To that end, controller 150 can be configured to operate one or more ignitors and fuel injectors, etc.

Controller 150 can include various computer system components that facilitate receiving and issuing electronic instructions, storing instructions, data and information, communicating with other devices, display devices, input devices, output devices and the like.

Circuit 152 can comprise any suitable computer architecture such as microprocessors, chips and the like that allow memory 156, processor 158, input device 160, output device 162 and communication interface 164 to operate together. Power supply 154 can comprise any suitable method for providing electrical power to controller 150, such as AC or DC power supplies. Memory 156 can comprise any suitable memory device, such as random access memory, read only memory, flash memory, magnetic memory and optical memory. Input device 160 can comprise a keyboard, mouse, pointer, touchscreen and other suitable devices for providing a user input or other input to circuit 152 or memory 156. Output device 162 can comprise a display monitor, a viewing screen, a touch screen, a printer, a projector, an audio speaker and the like. Communication interface 164 can comprise devices for allowing circuit 152 and controller 150 to receive information from and transmit information to other computing devices, such as a modem, a router, an I/O interface, a bus, a local area network, a wide area network, the internet and the like.

Controller 150 can receive inputs from grid control 166 to coordinate generation of power from power plant 10 based on demand from end users. Control 166 can assign or instruct power plant 10 whether or not to be on-line and how much power output they should contribute to the grid, such as by being in a turn-down operating mode or a base operating mode.

Circuit 152 can communicate with, that is, read from and write to, a memory device such as memory 156. Memory 156 can include various computer readable instructions for implementing operation of power plant 10. Thus, memory 156 can include instructions for monitoring requests from grid control 166. Memory 156 can include various computer readable instructions for implementing operation of power plant 10. Thus, memory 156 can include instructions for monitoring a power generation assignment from grid control 166, instructions for power generation for gas turbine engine 12, start-up instructions (e.g., associated instructions for components of gas turbine engine 12, such as ignitors and fuel injectors), instructions for pumps 88 and 90, instructions for damper 104, and the like. Memory 156 can include instructions for implementing the methods illustrated in FIG. 5, such as including instructions for coordinating operation of GTCC power plant 10 at step 202 and TES system 80 at step 204.

For peak load cases GTCC power plant 10 output and efficiency using TES system 80 (as shown in FIGS. 2 and 3) can represent a significant output and efficiency performance improvement over the plant 10 absent the TES system as shown in FIG. 1.

Although the GTCC power plant 10 output and efficiency using TES system 80 can represent a significant performance penalty at minimum load, the impact on overall economy of power plant 10 would be insignificant as electricity price at off-peak time is much lower. Furthermore, the reduced power output at minimum load could be beneficial in two ways: (1) to the grid, as other units can operate at higher load level for higher efficiency and lower emissions; and (2) increasing profit in specific regions (like California) that have a negative power price in some off-peak hours (i.e. time shifting production from low to high profit power pricing).

The implementation of the aforementioned devices, systems and methods can allow for one or various combinations of the following:

1. Increased power output at base load of GTCC power plants;
2. Increased base load efficiency (lower base load heat rate);
3. Increased energy production at peak demand times;
4. Increased revenue from higher operating efficiency;
5. Increased revenue from selling more high-priced electricity;
6. Other power producers can operate at higher efficiencies during off-peak times; and
7. Reduced penalties for operating during negative power price times.

Example Scenario

In a "standard" system, a gas turbine (GT) with a 250 MW power output can be used with a steam turbine (ST) sized to generate up to 120 MW of power. However, in that "standard" system, it could be the case that the steam turbine is slightly oversized, because the heat energy of the gas turbine (which can be converted to steam in the HRSG) is only 100 MW. In such a system, the maximum total output available via the combustion of the fuel (captured and converted in various manners) would be 350 MW: 250 MW from the GT and 100 MW from the ST. Ideally in this system, one would only use a steam turbine sized to generate 100 MW of power, because that's the maximum heat energy that can be extracted from the GT exhaust), For sake of explanation, we might call this theoretical maximum power output of the "standard" system Base power.

In the present disclosure, the same 250 MW gas turbine and 120 MW steam turbine can be used. Night, when less power is needed, can be considered a "turndown" operating mode during which the gas turbine produces 200 MW, and the steam turbine produces 80 MW. The TES system can absorb 20 MW—for a total turndown power output of 200 MW+80 MW−20 MW=260 MW. One of the advantages of operating in this fashion is that, absent the ability to absorb 20 MW via the TES, we would have to operate the gas turbine at an even lower level during turndown of approximately 180 MW. As one of ordinary skill in the art would appreciate, efficiency and emissions are negatively impacted as the output of a gas turbine is decreased beneath its base, design output, the. Therefore, by diverting unneeded energy into storage, the gas turbine may be operated in a more desirable (increased efficiency with reduced emissions) manner.

At day, when the power is needed (and the price of electricity sold is higher), this same system is now capable to produce more power as a result of the TES. During such daytime peak demand, this system is now capable to produce 370 MW (250 MW from the GT, 100 MW from the ST using the exhaust energy of the GT, and 20 MW from the ST using the energy recovered from the TES). For the sake of explanation we might call this "Peak" power.

VARIOUS NOTES & EXAMPLES

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMS), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, The following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A power plant, comprising:
a gas turbine productive of an exhaust gas;
a steam turbine;
a heat recovery steam generator that extracts heat from the exhaust gas and supplies heated fluid to the steam turbine;
a thermal storage unit storing a thermal storage working medium that is configured to discharge thermal energy into the heated fluid supplied from the heat recovery steam generator to supplement power generation by the steam turbine;
a first heat exchanger disposed within the heat recovery steam generator to transfer thermal energy from the exhaust gas to the thermal storage working medium; and
a second heat exchanger in flow communication with the heat recovery steam generator and the thermal storage unit, the second heat exchanger facilitating heat transfer of thermal energy from the thermal storage working medium in the thermal storage unit to the heated fluid supplied from the heat recovery steam generator;
wherein the second heat exchanger comprises an inlet for the heated fluid and an outlet for the heated fluid that are configured to route the heated fluid through the second heat exchanger in parallel with an evaporator line of the heat recovery steam generator.

2. The power plant of claim 1, wherein the thermal storage unit includes a cold tank containing the thermal storage working medium in a cold state and a hot tank containing the thermal storage working medium in a heated state.

3. The power plant of claim 2, wherein the thermal storage unit further comprises one or more pumps to circulate thermal storage working medium through the first and second heat exchangers and between the cold tank and hot tank.

4. The power plant of claim 1, wherein the inlet and the outlet for the second heat exchanger are located on opposite sides of a high pressure drum of the heat recovery steam generator and are configured to flow the heated fluid in an opposite-flow relationship with exhaust gas flow of the heat recovery steam generator.

5. The power plant of claim 1, wherein the second heat exchanger comprises a molten salt cooler/water evaporator.

6. The power plant of claim 1, wherein the first heat exchanger comprises a thermal storage working medium pipe positioned within a duct of the heat recovery steam generator, wherein the thermal storage working medium flows through the pipe in an opposite-flow relationship with exhaust gas flow of the heat recovery steam generator.

7. The power plant of claim 6, wherein the first heat exchanger comprises a molten salt heater/exhaust gas cooler.

8. The power plant of claim 1, further comprising:
a divider wall extending through the heat recovery steam generator to produce a duct for the first heat exchanger separate from a main exhaust flow duct of the heat recovery steam generator; and
a damper to regulate flow of the exhaust gas through the duct and across the first heat exchanger.

9. The power plant of claim 1, wherein the thermal storage working medium comprises a phase change material or a thermo-chemical material.

10. A method of operating a power plant, the method comprising:
extracting heat from exhaust of a gas turbine to generate a heated fluid while the gas turbine engine is operating in a turn-down mode;
turning a steam turbine with the heated fluid;
heating a thermal storage working medium with the exhaust;
storing the thermal storage working medium in a thermal storage unit; and
transferring heat from the thermal storage working medium to the heated fluid while the gas turbine is operating in base or peak operating modes.

11. The method of claim 10, further comprising storing the thermal storage working medium in a cold storage tank after transferring heat from the thermal storage working medium to the heated fluid.

12. The method of claim 10, further comprising storing the thermal storage working medium in a hot storage tank after heating the thermal storage working medium with the exhaust.

13. The method of claim 10, further comprising heating the thermal storage working medium with the exhaust during off-peak power consumption periods for the power plant.

14. The method of claim 13, further comprising operating a heat recovery steam generator (HRSG) that extracts the heat from the exhaust in a turn-down state during off-peak power consumption periods.

15. The method of claim 10, wherein transferring heat from the thermal storage working medium occurs during periods of power plant peak power generation.

16. The method of claim 15, further comprising operating a HRSG that extracts the heat from the exhaust gas to generate the heated fluid in a base operating state during the periods of power plant peak power generation such that the heated fluid is receiving heat input that originated from the gas turbine exhaust that is greater than the heat output of the gas turbine exhaust in the base operating state.

17. The method of claim 15, further comprising operating a damper to block flow of the exhaust gas from heating the thermal storage working medium during the periods of power plant peak power generation.

18. A gas turbine power plant comprising:
a gas turbine operable to generate exhaust gas;
a heat recovery steam generator configured to receive the exhaust gas from the gas turbine to heat a fluid;
a steam turbine configured to be driven by the heated fluid produced by the heat recovery steam generator;
at least one electric generator configured to be driven by the gas turbine or the steam turbine;
a thermal energy storage system for a thermal storage working medium, the thermal energy storage system comprising:
a first heat exchanger configured to be in communication with the exhaust gas and the thermal storage working medium; and
a second heat exchanger configured to be in communication with the heated fluid and the thermal storage working medium; and
a controller configured to:
heat the thermal storage working medium in the first heat exchanger during turn-down operation of the heat recovery steam generator while the gas turbine is operating below base load; and transfer heat to the heated fluid in the second heat exchanger during base operation of the power plant while the gas turbine is operating at base load or above.

19. The gas turbine power plant of claim 18, wherein the controller is further configured to operate pumps to circulate thermal storage working medium between the first and second heat exchangers to time-shift heat generated by the gas turbine while operating below base load to the heated fluid when the gas turbine is operating at or above base load.

20. The gas turbine power plant of claim 18, wherein the controller is further configured to operate a damper to inhibit flow of exhaust gas across the first heat exchanger.

* * * * *